US012299476B2

United States Patent
Yu et al.

(10) Patent No.: US 12,299,476 B2
(45) Date of Patent: May 13, 2025

(54) METHOD FOR DETECTING A PROCESSOR, A COMPUTER-READABLE STORAGE MEDIUM AND AN ELECTRONIC DEVICE

(71) Applicant: HORIZON (SHANGHAI) ARTIFICIAL INTELLIGENCE TECHNOLOGY CO., LTD., Shanghai (CN)

(72) Inventors: Ming Yu, Shanghai (CN); Xiaofeng Ling, Shanghai (CN)

(73) Assignee: HORIZON (SHANGHAI) ARTIFICIAL INTELLIGENCE TECHNOLOGY CO., LTD., Shanghai (CN)

( * ) Notice: Subject to any disclaimer, the term of this patent is extended or adjusted under 35 U.S.C. 154(b) by 399 days.

(21) Appl. No.: 17/344,117

(22) Filed: Jun. 10, 2021

(65) Prior Publication Data

US 2021/0389974 A1 Dec. 16, 2021

(30) Foreign Application Priority Data

Jun. 12, 2020 (CN) .......................... 202010533804.3

(51) Int. Cl.
G06F 9/46 (2006.01)
G06F 9/48 (2006.01)
(52) U.S. Cl.
CPC .................... *G06F 9/4812* (2013.01)
(58) Field of Classification Search
CPC ................................................... G06F 9/4812
See application file for complete search history.

(56) References Cited

U.S. PATENT DOCUMENTS

| 11,126,575 | B1* | 9/2021 | Aslanidis | G06F 13/24 |
| 2012/0265471 | A1* | 10/2012 | Hess | G06F 11/30 |
| | | | | 702/88 |
| 2016/0092320 | A1 | 3/2016 | Baca | |
| 2017/0153897 | A1* | 6/2017 | Frazier | G06F 9/3861 |
| 2018/0165144 | A1 | 6/2018 | Rah et al. | |

(Continued)

FOREIGN PATENT DOCUMENTS

| CN | 1370294 A | 9/2002 |
| CN | 103853692 A | 6/2014 |

(Continued)

*Primary Examiner* — Tammy E Lee
(74) *Attorney, Agent, or Firm* — Brooks Kushman P.C.

(57) ABSTRACT

A method for detecting a processor comprises: determining a parameter stored in a first-type register in a detected processor, which is used to detect changes in the data processed by the detected processor, wherein the parameter relates to the a number of the data that needs to be processed currently by the detected processor, and relates to the a processing mode of the data that needs to be processed currently by the detected processor which can be characterized by using information of instructions or functions called during processing; determining a working state of the detected processor based on the parameter, and performing an interrupt missing handling operation if the working state is a first type of working state being an interrupt missing state. The method can conveniently and reliably realize the detection of interrupt loss, thereby effectively monitoring the situation of interrupt loss.

19 Claims, 8 Drawing Sheets

(56) References Cited

U.S. PATENT DOCUMENTS

2018/0211708 A1* 7/2018 Igahara ................ G11C 16/105
2018/0285293 A1* 10/2018 Dykema ............... G06F 9/4812
2019/0095137 A1* 3/2019 Park ..................... G06F 3/0613

FOREIGN PATENT DOCUMENTS

| CN | 105183575 A | 12/2015 |
| CN | 107844392 A | 3/2018 |
| CN | 111048139 A | 4/2020 |

* cited by examiner

Determining a parameter stored in a first-type register of a detected processor, wherein the parameter stored in the first-type register relates to data to be processed currently by the detected processor — 201

Determining a working state of the detected processor based on the parameter stored in the first-type register — 202

METHOD FOR DETECTING A PROCESSOR, A COMPUTER-READABLE STORAGE MEDIUM AND AN ELECTRONIC DEVICE

CROSS-REFERENCE TO RELATED APPLICATIONS

This application claims priority to Chinese Application No. 202010533804.3 filed on Jun. 12, 2020, entitled "PROCESSOR DETECTION METHOD AND DEVICE AND COMPUTER-READABLE STORAGE MEDIUM," which is hereby incorporated by reference in its entirety.

TECHNICAL FIELD

The present disclosure relates to the field of communication technology, in particular to a processor detection method and device, and a computer-readable storage medium.

BACKGROUND

Chips may include a general purpose processor and a dedicated processor. The dedicated processor can inform the general purpose processor by means of interrupts after completing a specific task. In some cases, the interrupt is missed (that is, although the dedicated processor has completed a specific task, the general purpose processor does not receive the information), which will cause the entire chip to be abnormal. Therefore, it is necessary to detect the loss of interrupt, and how to realize the interrupt missing detection is an urgent issue for those skilled in the art.

SUMMARY

In order to solve the above technical problem, the present disclosure is proposed. Embodiments of the present disclosure provide a processor detection method and device, and a computer-readable storage medium.

According to an aspect of the embodiments of the present disclosure, there is provided a processor detection method including: determining a parameter stored in a first-type register of a detected processor, wherein the parameter stored in the first-type register relates to data to be processed currently by the detected processor; determining a working state of the detected processor based on the parameter stored in the first-type register.

According to another aspect of the embodiments of the present disclosure, there is provided a processor detection device including: a first determining module configured to determine a parameter stored in a first-type register of a detected processor, wherein the parameter stored in the first-type register is related to data that need to be processed currently by the detected processor; a second determining module configured to determine a working state of the detected processor based on the parameter stored in the first-type register and determined by the first determining module.

According to another aspect of the embodiments of the present disclosure, a computer-readable storage medium is provided, on which a computer program used to execute the above-mentioned processor detection method is stored.

According to another aspect of the embodiments of the present disclosure, there is provided an electronic apparatus, including: a processor; a memory for storing processor executable instructions; wherein the processor is configured to read the instructions from the memory, and execute the instructions to implement the above-mentioned processor detection method.

Based on the processor detection method, the processor detection device, the computer-readable storage medium, and the electronic apparatus provided by the above-mentioned embodiments of the present disclosure, the working state of the detected processor can be determined based on the parameter stored in the first-type register of the detected processor and relates to the data to be processed currently by the detected processor. Generally speaking, before the dedicated processor completes a specific task, the data to be processed by the dedicated processor changes rapidly, based on which, in the embodiments of the present disclosure, the dedicated processor can be used as the detected processor to detect changes in the data processed by the dedicated processor on the basis of the parameter stored in the first-type registers in the dedicated processor, thereby obtaining the working state of the dedicated processor which can characterize whether the dedicated processor misses the interrupt. It can be seen that the embodiments of the present disclosure can easily and reliably realize the interrupt missing detection, so as to effectively monitor the interrupt missing situation.

The technical solutions of the present disclosure will be further described in detail below through the accompanying drawings and embodiments.

BRIEF DESCRIPTION OF THE DRAWINGS

The above and other objects, features and advantages of the present disclosure will become more obvious by describing embodiments of the present disclosure in more details with reference to the drawings. The drawings provide further understanding of the embodiments of the present disclosure and constitute a portion of the specification. The drawings, together with the embodiments of the present disclosure, are used to explain this disclosure but do not constitute restrictions on the disclosure. In the drawings, the same reference number generally refers to the same portion or step.

DETAILED DESCRIPTION

Figures 1, 2:
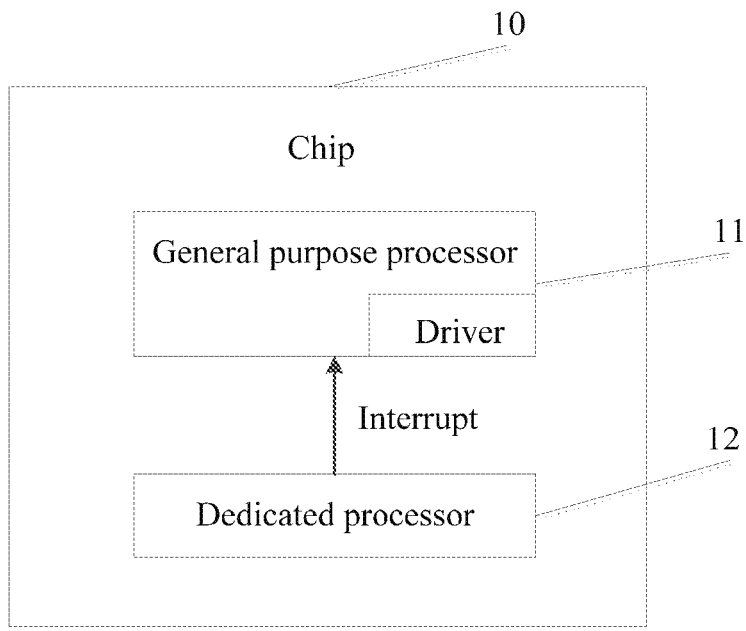
FIG. 1 is a structural diagram of a heterogeneous design scheme of a general purpose processor plus a dedicated processor in an exemplary embodiment of the present disclosure.
FIG. 2 is a schematic flowchart of a processor detection method provided by an exemplary embodiment of the present disclosure.

Hereinafter, exemplary embodiments according to the present disclosure will be described in detail with reference to the accompanying drawings. Obviously, the described embodiments are only a part of, rather than all of the embodiments of the present disclosure. It should be understood that the present disclosure is not limited by the exemplary embodiments described herein.

It should be noted that unless specifically stated otherwise, the relative arrangement of components and steps, numerical expressions, and numerical values set forth in these embodiments do not limit the scope of the present disclosure.

Those skilled in the art can understand that terms such as "first" and "second" in the embodiments of the present disclosure are only used to distinguish different steps, devices or modules, etc., and do not represent any specific technical meanings, nor do they mean there are any necessary logical order between them.

It should also be understood that in the embodiments of the present disclosure, "plurality" may refer to two or more than two, and "at least one" may refer to one, two, or more than two.

It should also be understood that any component, data, or structure mentioned in the embodiments of the present disclosure can generally be understood as one or more unless it is clearly defined or given opposite enlightenment in the context.

In addition, the term "and/or" in the present disclosure is merely an association relationship describing associated objects, which means that there can be three types of relationships, for example, A and/or B can mean three cases as follows: A alone, both A and B existing at the same time, and B alone. In addition, the character "/" in the present disclosure generally indicates that associated objects before and after are in an "or" relationship.

It should also be understood that the description of the various embodiments in the present disclosure emphasizes differences between various embodiments, and the same or similar points can be referred to each other, and for the sake of brevity, they will not be repeated one by one.

At the same time, it should be understood that, for ease of description, the sizes of various parts shown in the drawings are not drawn in accordance with actual proportional relationships.

The following description for at least one exemplary embodiment is actually only illustrative, and in no way serves as any limitation to the present disclosure and its application or use.

The technologies, methods, and devices well known to those of ordinary skill in the relevant arts may not be discussed in detail, but where appropriate, the technologies, methods, and devices should be regarded as part of the specification.

It should be noted that similar reference numbers and letters indicate similar items in the following drawings, and therefore, once an item is defined in one drawing, it does not need to be further discussed in the subsequent drawings.

The embodiments of the present disclosure can be applied to electronic devices such as terminal apparatus, computer systems, servers, etc., which can operate with many other dedicated or general purpose computing system environments or configurations. Examples of well known terminal apparatuses, computer systems, environments and/or configurations suitable for use with electronic apparatuses such as terminal apparatus, computer systems, servers, etc. include, but are not limited to: personal computer systems, server computer systems, thin clients, and thick clients, handheld or laptop apparatus, microprocessor-based systems, set-top boxes, programmable consumer electronics, networked personal computers, small computer systems, large computer systems, and distributed cloud computing technology environments including any of the above systems, etc.

Electronic apparatuses such as terminal apparatus, computer systems, and servers, etc. can be described in the general context of computer system executable instructions (such as program modules) executed by the computer system. Generally, program modules may include routines, programs, object programs, components, logic, data structures, etc., which perform specific tasks or implement specific abstract data types. The computer system/server can be implemented in a distributed cloud computing environment. In the distributed cloud computing environment, tasks are executed by remote processing apparatus linked through a communication network. In a distributed cloud computing environment, program modules may be located on a storage medium of a local or remote computing system including a storage apparatus.

Overview

Thanks to the development under the Moore's Law in recent years, the computing power of hardware is becoming more and more powerful, and tasks that general purpose processors can support are becoming more and more complex. The general purpose processors can process hundreds types of tasks. However, the general purpose processors are strongly limited for some specific tasks (such as tasks related to neural network algorithms). In order to ensure the flexibility of general purpose processors, the general purpose processors are generally not optimized for these specific tasks. Instead it adopts a heterogeneous design scheme that uses a general purpose processor and a dedicated processor, that is, a general purpose processor and a dedicated processor are set in a chip at the same time, wherein the dedicated processor is used to process specific tasks, such as the tasks related with above-mentioned neural network algorithms.

In the heterogeneous design scheme of a general purpose processor plus a dedicated processor, the general purpose processor and the dedicated processor communicate by means of interrupts, and the dedicated processor informs the general purpose processor by means of an interrupt after completing a specific task. In the process of implementing the present disclosure, the inventors found that interrupts may be missed in some cases, that is, although the dedicated processor completes a specific task, the general purpose processor does not receive the information. If the interrupt missing issue of the dedicated processor cannot be effectively detected, it may lead to an abnormality of the entire chip.

Exemplary Overview

As shown in FIG. 1, a chip 10 may include a general purpose processor 11 and a dedicated processor 12, wherein the dedicated processor 12 may have a driver and may exist as an exterior attachment of the dedicated processor 12, and the general purpose processor 11 and dedicated processor 12 can communicate with each other in an interrupt mode.

When being responsible for processing tasks related to neural network algorithms, the dedicated processor 12 may also be referred to as an artificial intelligence (AI) processor.

The dedicated processor 12 may be used as a detected processor in the embodiments of the present disclosure. During the specific implementation, the general purpose processor 11 can execute a processor detection method in the embodiments of the present disclosure to conveniently and reliably determine whether an interrupt from the dedicated processor 12 is missed; or, an additional processor can be provided for executing the detection method for the processor in the embodiments of the present disclosure to conveniently and reliably determine whether the dedicated processor 12 misses the interrupt.

Exemplary Method

FIG. 2 is a schematic flowchart of a processor detection method provided by an exemplary embodiment of the present disclosure. The method shown in FIG. 2 includes step 201 and step 202, each of which will be described separately below.

Step 201: determining a parameter stored in a first-type register of a detected processor, wherein the parameter stored in the first-type register relates to data to be processed currently by the detected processor.

Here, the detected processor may be a dedicated processor, for example, the dedicated processor 12 in FIG. 1.

It should be noted that there can be a plurality of registers in the detected processor, and different registers can be used to store different types of parameters. In step 201, the first-type register in the detected processor can be filtered out according to the type of parameter stored in each register of the detected processor, and then the parameter stored in the filtered-out first-type register may be determined.

Optionally, the parameter stored in the first-type register relates to data to be processed currently by the detected processor, including but not limited to the following situations: the parameter stored in the first-type register relates to the content of the data to be processed currently by the detected processor, the parameter stored in the first-type register relates to the number of the data to be processed currently by the detected processor, and the parameter stored in the first-type register relates to the processing mode of the data to be processed currently by the detected processor (which can be characterized by using the information of instructions or functions called during processing).

Step 202: determining a working state of the detected processor based on the parameter stored in the first-type register.

Here, based on the parameter stored in the first-type register, the determined working state of the detected processor can be divided in two possible situations, namely a first type of working state which may be an interrupt missing state (this means that the detected processor misses an interrupt) and a second type of working state which may be a non-interrupt-missing state (this means that the detected processor does not miss any interrupt).

In the embodiments of the present disclosure, the working state of the detected processor may be determined, based on the parameter stored in the first-type register in the detected processor and related to the data need to be processed currently by the detected processor. Generally speaking, before the dedicated processor completes a specific task, the data need to be processed by the dedicated processor changes rapidly, based on which, in the embodiments of the present disclosure, the dedicated processor can be used as the detected processor, so as to detect a changing state of the dedicated processor, thereby obtaining the working state of the dedicated processor which can indicate whether there is any interrupt missing in the dedicated processor. It can be seen that the embodiments of the present disclosure can easily and reliably realize the interrupt missing detection, so as to effectively monitor the interrupt missing situation.

Figure 3:
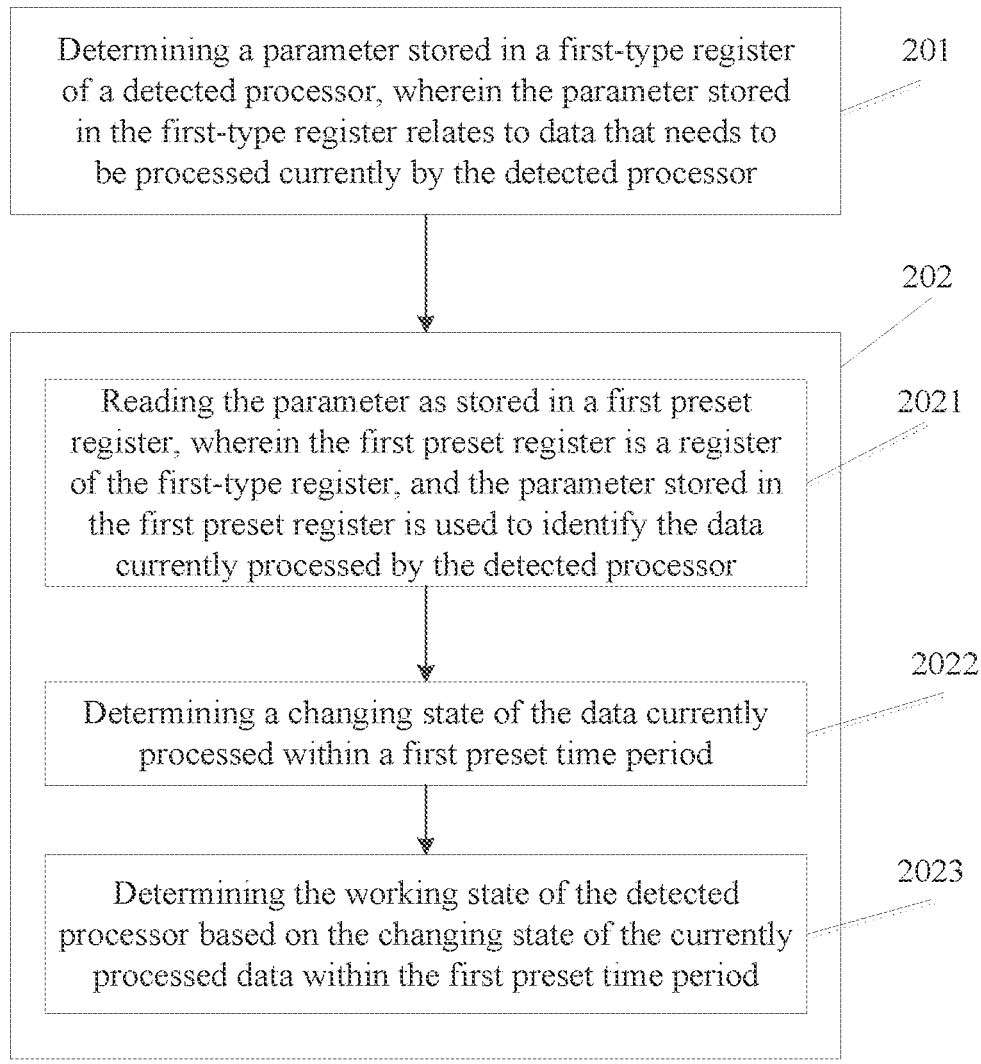
FIG. 3 is a schematic flowchart of a processor detection method provided by another exemplary embodiment of the present disclosure.

As shown in FIG. 3, based on the embodiment shown in FIG. 2, step 202 may include:

Step 2021: reading a parameter stored in a first preset register, wherein the first preset register is a register of the first-type register, and the parameter stored in the first preset register is used to identify the data currently processed by the detected processor.

Here, the data currently processed by the detected processor may be specifically identified by a label. At this time, the parameter stored in the first preset register may be the label of the data currently processed by the detected processor. The first preset register in this case may be called an fc_head register, and the parameter stored in the first preset register in this case may be called an fc_head value.

Step 2022: determining a changing state of the data currently processed within a first preset time period.

Here, the first preset time period may be 1 second, 2 seconds, or other values, which will not be listed here.

In step 2022, the changing state of the currently processed data within the first preset time period can be determined based on the changing state of the parameter stored in the first preset register within the first preset time period, wherein the changing state can be used to characterize whether there is any changing and what kind of changing has occurred. Specifically, if the parameter stored in the first preset register does not change within the first preset time period, it can be determined that the currently processed data does not change within the first preset time period; if the parameter stored in the first preset register changes within the first preset time period, it can be determined that the currently processed data also changes within the first preset time period; if the parameter stored in the first preset register changes three times within the first preset time period, it can be determined the currently processed data also changes three times within the first preset time period.

Step 2023: determining the working state of the detected processor based on the changing state of the currently processed data within the first preset time period.

In a specific implementation, step 2023 includes: if the currently processed data does not change within the first preset time period, the working state of the detected processor is determined to be the first type of working state; otherwise, the working state of the detected processor is determined to be the second type of working state.

Generally speaking, before the dedicated processor completes a specific task, the data to be processed by the dedicated processor is rapidly changing. That the data currently processed by the dedicated processor being as the detected processor does not change within the first preset time period is inconsistent with the situation that the dedicated processor normally processes a specific task. At this time, it can be considered that the dedicated processor misses an interrupt, then the working state of the dedicated processor can be determined to be the first type of working state; otherwise, the working state of the dedicated processor can be determined to be the second type of working state.

In this implementation, based on whether the currently processed data changes within the first preset time period, the working state of the detected processor can be easily and reliably determined.

Of course, the specific implementation of step 2023 is not limited to this. For example, it can be combined with whether the currently processed data changes within the first preset time period, and the variation of parameters stored in other registers (for example, the second preset register hereinafter), to determine the working state of the detected processor.

It can be seen that in the embodiments of the present disclosure, since the parameter stored in the first preset register can accurately identify the data currently processed by the detected processor, the working state of the detected processor can be easily and reliably determined by the parameter stored in the first preset register.

Figure 4:
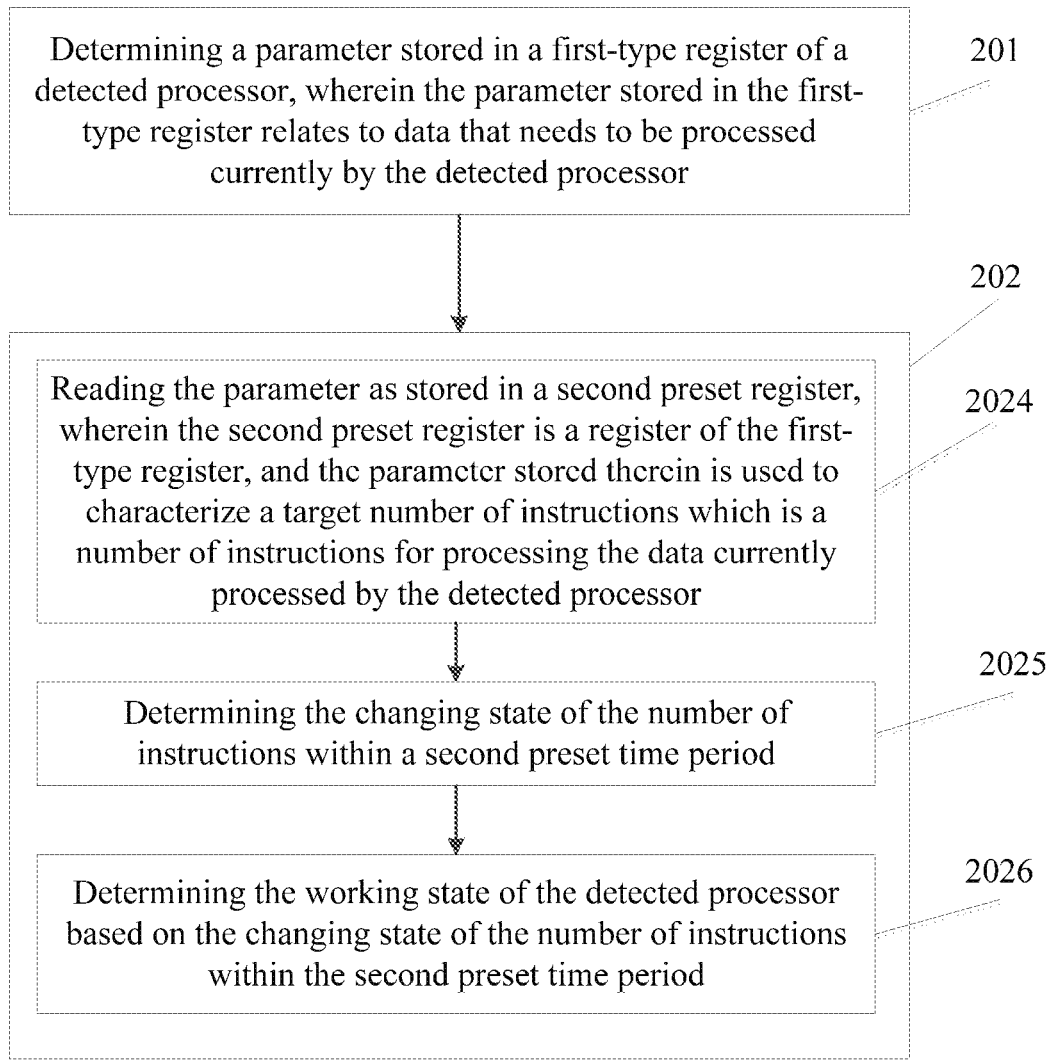
FIG. 4 is a schematic flowchart of a processor detection method provided by another exemplary embodiment of the present disclosure.

As shown in FIG. 4, based on the embodiment shown in FIG. 2, step 202 may include:

Step 2024: reading a parameter stored in a second preset register, wherein the second preset register is a register of the first-type register, and the parameter stored therein is used to characterize a target number of instructions which is a number of instructions for processing the data currently processed by the detected processor.

Here, the second preset register may be an instruction-length register (which may also be called an inst_num register), and the parameter stored in the second preset register may be an inst_num value which characterizes the number of an instructions to process the data currently processed by the detected processor (it can also be seen as instruction length).

Step 2025: determining the changing state of the number of instructions within a second preset time period.

Here, the second preset time period may be 1 second, 2 seconds, or other values alike, which will not be listed here. Optionally, the first preset time period and the second preset time period may be the same or different. Further, when the first preset time period and the second preset time period are the same, they may be timed by the same timer or be timed synchronously by different timers, and when the first preset time period is different from the second preset time period, different timers may be used for timing.

In step 2025, the changing state of the number of instructions within the second preset time period can be determined based on the changing state of the parameter stored in the second preset register within the second preset time period, wherein the changing state can be used to characterize whether there is any change and what kind of change has occurred, etc. Specifically, if the parameter stored in the second preset register does not change within the second preset time period, it can be determined that the number of instructions does not change within the second preset time period; if the parameter stored in the second preset register changes within the second preset time period, it can be determined that the number of instructions also changes within the second preset time period; if the parameter stored in the second preset register changes five times within the second preset time period, it can be determined that the number of instructions also changes five times within the second preset time period.

Step 2026: determining the working state of the detected processor based on the changing state of the number of instructions within the second preset time period.

In an implementation, step 2026 includes: determining the working state of the detected processor as the first type of working state if the number of instructions does not change within the second preset time period; otherwise, determining the working state of the detected processor as the second type of working state.

Generally speaking, before the dedicated processor completes a specific task, the data to be processed by the dedicated processor changes rapidly, and the numbers of instructions used to process different data are often different. In this way, before the dedicated processor completes the specific task, the number of instructions also changes rapidly. This is inconsistent with the normal situation where the dedicated processor processes the specific task if the number of instructions does not change within the second preset time period. At this time, it can be considered that the dedicated processor misses an interrupt, then it can be determined that the working state of the dedicated processor is the first type of working state; otherwise, it can be determined that the working state of the dedicated processor is the second type of working state.

In this implementation, because the number of instructions can accurately represent the manner of currently processing the data by the detected processor, and the processing manners of different data are generally different, the working state of the detected processor can be easily and reliably determined through the changing state of the number of instructions within the second preset time period.

Of course, the specific implementation mode of step 2026 is not limited to this. For example, the changing state of the currently processed data within the first preset time period and the changing state of the number of instructions within the second preset time period can be combined to determine the working state of the detected processor to further ensure the reliability of the determination result. Specifically, if the currently processed data does not change within the first preset time period, and the number of instructions does not change within the second preset time period, it can be determined that the working state of the detected processor is the first type of working state; otherwise, it can be determined that the working state of the detected processor is the second type of working state.

It can be seen that, in the embodiments of the present disclosure, since the parameter stored in the second preset register can accurately characterize the number of instructions used to process the data currently processed by the detected processor, the working state of the detected processor can be reliably and conveniently determined by the parameter stored in the second preset register.

Figure 5:
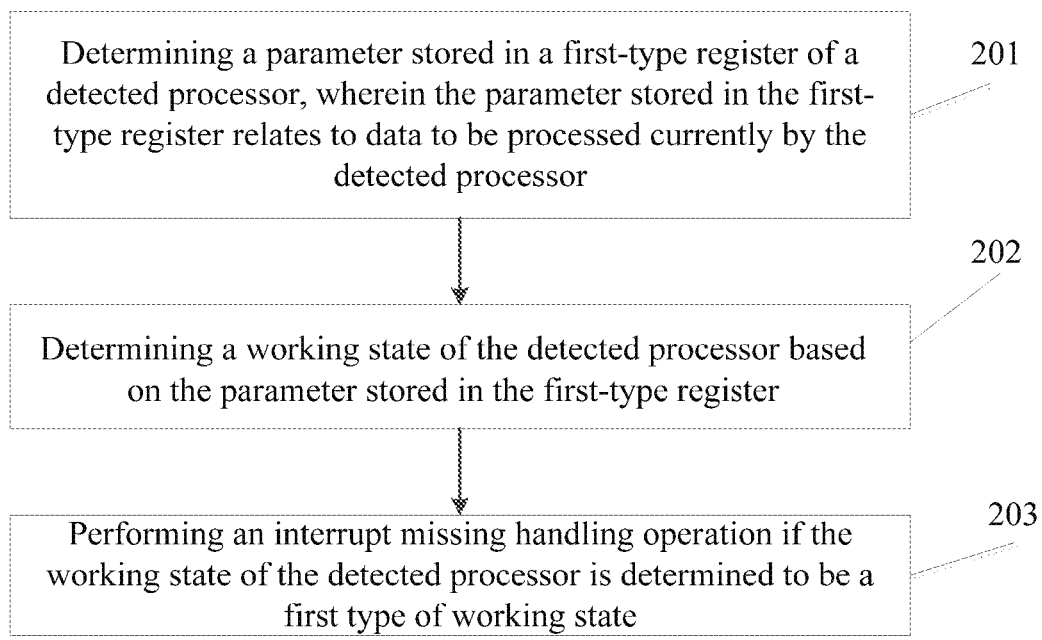
FIG. 5 is a schematic flowchart of a processor detection method provided by another exemplary embodiment of the present disclosure.

As shown in FIG. 5, based on the embodiment shown in FIG. 1, following step 202, the method may further include:
Step 203: performing an interrupt missing handling operation if the working state of the detected processor is determined to be a first type of working state.

In a specific implementation, step 203 includes: outputting an interrupt missing alarm signal; and/or, generating a signal for simulating an interrupt trigger signal sent by the detected processor, and sending the generated signal to an element designated to receive the interrupt trigger signal.

Here, the interrupt missing alarm signal (or the alarm signal on interrupt missing) can be output in the form of sound, mail, short message, etc.

Here, the element designated to receive the interrupt trigger signal may be a general purpose processor, for example, the general purpose processor 11 in FIG. 1.

It means that the dedicated processor misses an interrupt if the working state of the dedicated processor is determined to be the first type of working state, in which case, the interrupt missing alarm signal can be output to notify relevant personnel of the interrupt missing occurrence, so that relevant personnel can check and repair the dedicated processor in time. In addition, a signal can also be generated, simulating the interrupt trigger signal which is sent to the general purpose processor by the dedicated processor normally, and is provided to the dedicated processor. In this way, even if an interrupt is missed, the general purpose processor can successfully receive the notification to try to avoid abnormality caused by the interrupt missing.

It can be seen that, in the embodiments of the present disclosure, by executing the interrupt missing handling operation, corresponding processing can be performed in time for the interrupt handling situation, so as to avoid the adverse effects caused by the interrupt missing as much as possible.

Figure 6:
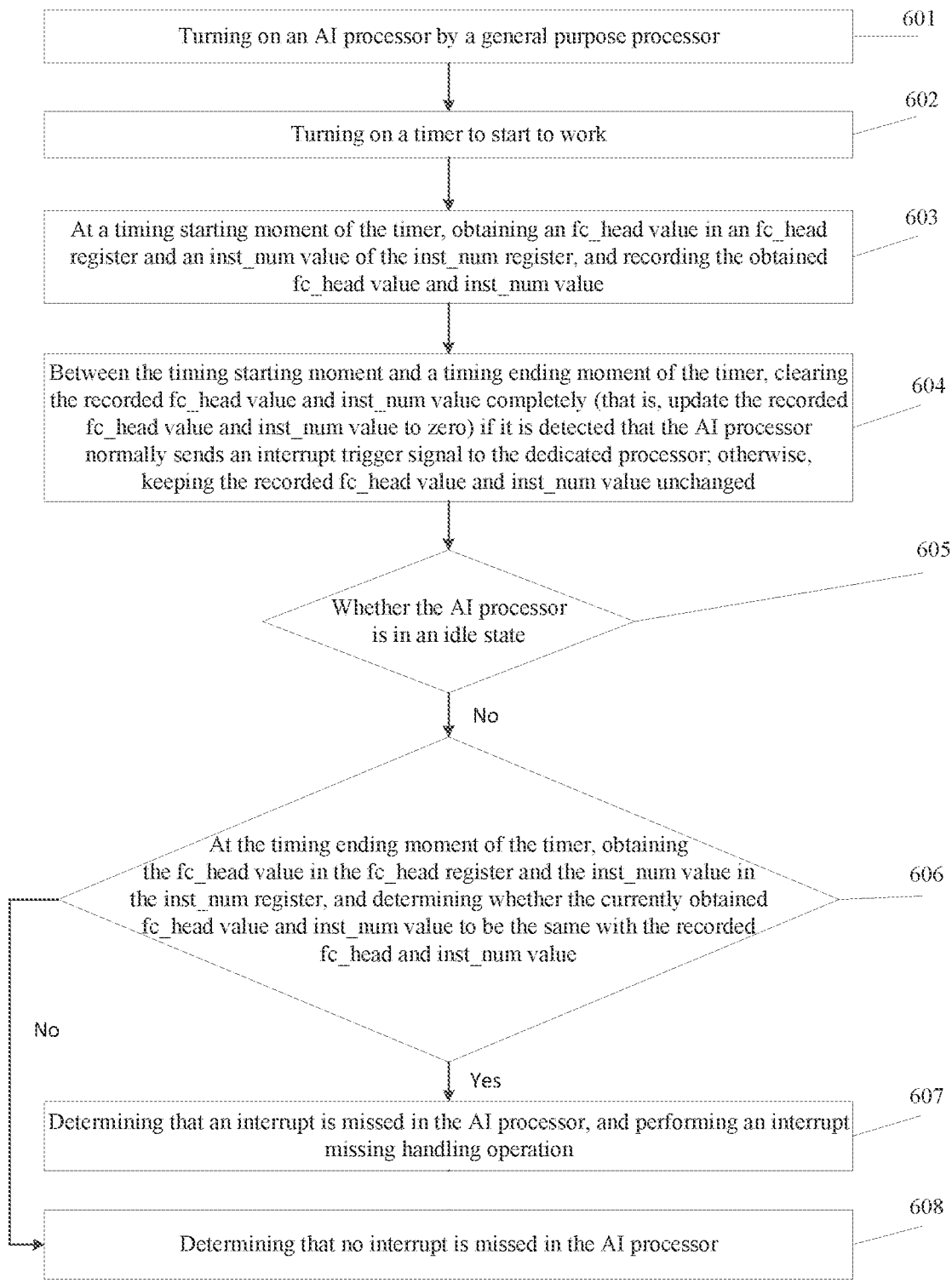
FIG. 6 is a schematic flowchart of a processor detection method provided by another exemplary embodiment of the present disclosure.

In an alternative example, a timer can be maintained in the driver of a general purpose processor. In order to realize the interrupt missing detection of a dedicated processor (such as an AI processor) as a peripheral of a general purpose processor, as shown in FIG. 6, the following steps can be performed:

Step 601, turning on an AI processor by a general purpose processor.

Step 602: turning on a timer to start to work (the timing period of the timer can be set to 2 seconds, which is equivalent to the first preset time period and the second preset time period mentioned above, that is, corresponds to a situation that the first preset time period and the second preset time period both are 2 seconds).

Step 603: at a timing starting moment of the timer (assuming that the moment is 08:00:00), obtaining an fc_head value in an fc_head register (equivalent to the first preset register above) and an inst_num value of an inst_num register (equivalent to the second preset register above), and recording the obtained fc_head value and inst_num value.

Step 604: between the timing starting moment and a timing ending moment of the timer (that is, between 08:00:00 and 08:00:02), clearing the recorded fc_head value and inst_num value completely (that is, update the recorded fc_head value and inst_num value to zero) if it is detected that the AI processor normally sends an interrupt trigger signal to the dedicated processor; otherwise, keeping the recorded fc_head value and inst_num value unchanged.

Step 605: determining whether the AI processor is in an idle state; if not (at this time, the AI processor can be considered to be in a busy state), proceeding to step 606.

Step 606: at the timing ending moment of the timer (i.e. 08:00:02), obtaining the fc_head value in the fc_head register and the inst_num value in the inst_num register, and determining whether the currently obtained fc_head value and inst_num value to be the same with the recorded fc_head and inst_num value; if they are the same (this is equivalent to that the data currently processed by the AI processor does not change within the first preset time period, and the number of instructions used to process the currently processed data does not change within the second preset time period), proceeding to step 607; otherwise, proceeding to step 608.

Step 607: determining that an interrupt is missed in the AI processor, and performing an interrupt missing handling operation.

Step 608: determining that no interrupt is missed in the AI processor.

It can be seen that the embodiment of the present disclosure provides a mechanism for detecting an interrupt missing occurrence on the AI processor, by means of which, by checking whether the parameters in the fc_head register and the inst_num register of the AI processor change, the AI processor can be easily and reliably determined whether any interrupt is missed, and corresponding handling shall be performed to ensure the normal communication between the AI processor and the dedicated processor. When the AI processor is turned off, the timer can be turned off accordingly.

In addition, it should be pointed out that because the maximum value of the fc_head value (for example, 2048) is limited, when the fc_head value in the fc_head register is updated quickly (for example, the update cycle is less than 1 millisecond), there is a certain possibility that at the timing starting moment and the timing ending moment, the fc_head value in the fc_head register is the same but a normal interrupt actually occurs (for example, between the timing starting moment and the timing ending moment of the timer, the fc_head value in the fc_head register may have undergone changes from 100 to 300, 300 to 500, 500 to 700, . . . , 80 to 100), and the inst_num value in the inst_num register is a relatively random value, so there is also a certain possibility that at the timing starting moment and the timing ending moment of the timer, the inst_num value in the inst_num register is the same but a normal interrupt occurs. In view of this, in the embodiment of the present disclosure, between the timing starting moment and the timing ending moment of the timer, the recorded fc_head value and inst_num value can be cleared when a normal interrupt is detected. The fc_head value and inst_num value obtained at the timing ending moment of the timer are compared with zero, and the comparison result is obviously inconsistent. Therefore, the embodiment of the present disclosure can better avoid incorrectly determining that there is an interrupt missing occurrence on the AI processor, which can improve the accuracy of interrupt missing detection, under the situation that the fc_head values in the fc_head register are the same and the inst_num values in the inst_num register are the same at the timing starting moment and the timing ending moment of the timer too.

Any processor detection method provided by the embodiments of the present disclosure can be executed by any suitable device with data processing capabilities, including but not limited to: terminal apparatus and servers, etc. Alternatively, any processor detection method provided by the embodiments of the present disclosure may be executed by a processor. For example, the processor executes any processor detection method mentioned in the embodiments of the present disclosure by calling a corresponding instruction stored in a memory and it will not be repeated in detail again.

Exemplary Device

Figure 7:
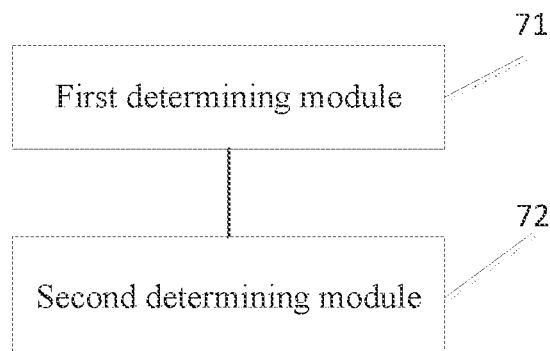
FIG. 7 is a structural diagram of a processor detection device provided by an exemplary embodiment of the present disclosure.

FIG. 7 is a schematic structural diagram of a detection device for a processor provided by an exemplary embodiment of the present disclosure. The device shown in FIG. 7 includes a first determining module 71 and a second determining module 72.

The first determining module 71 is configured to determine a parameter stored in a first-type register in a detected processor, wherein the parameter stored in the first-type register relates to data needed to be processed currently by the detected processor.

The second determining module 72 is configured to determine a working state of the detected processor based on the parameter stored in the first-type register and determined by the first determining module 71.

Figure 8:
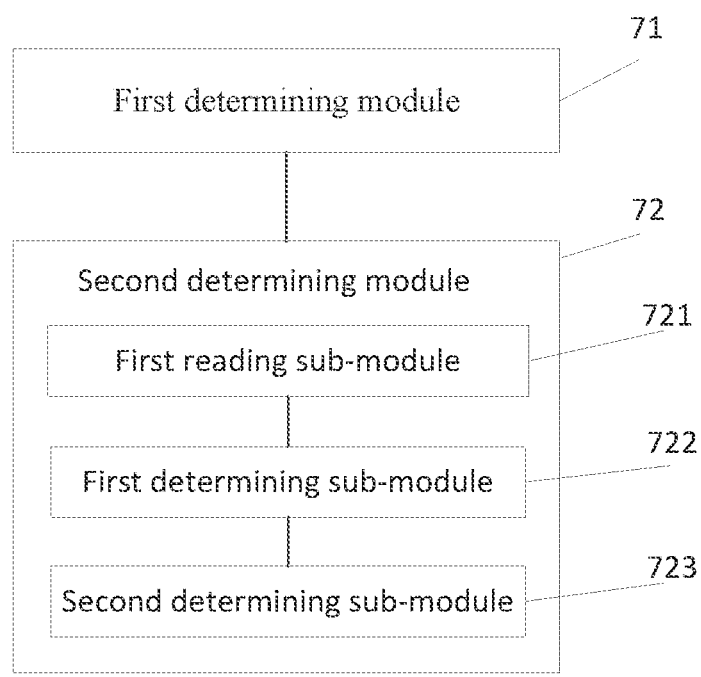
FIG. 8 is a structural diagram of a processor detection device provided by another exemplary embodiment of the present disclosure.

In an optional example, based on the embodiment shown in FIG. 7, as shown in FIG. 8, the second determining module 72 includes: a first reading sub-module 721 configured to read a parameter stored in a first preset register, wherein the first preset register is a register of the first-type register, and the parameter stored in the first preset register is used to identify the data currently processed by the detected processor; a first determining sub-module 722 configured to determine a changing state of the currently processed data labeled by the parameter read by the first reading sub-module 721 within a first preset time period; a second determining sub-module 723 configured to determine the working state of the detected processor based on the changing state of the currently processed data determined by the first determining sub-module 722 within the first preset time period.

In an optional example, the second determining sub-module 723 is specifically configured to determine that the working state of the detected processor is a first type of working state if the currently processed data does not change within the first preset time period; otherwise, determining the working state of the detected processor is a second type of working state.

Figure 9:
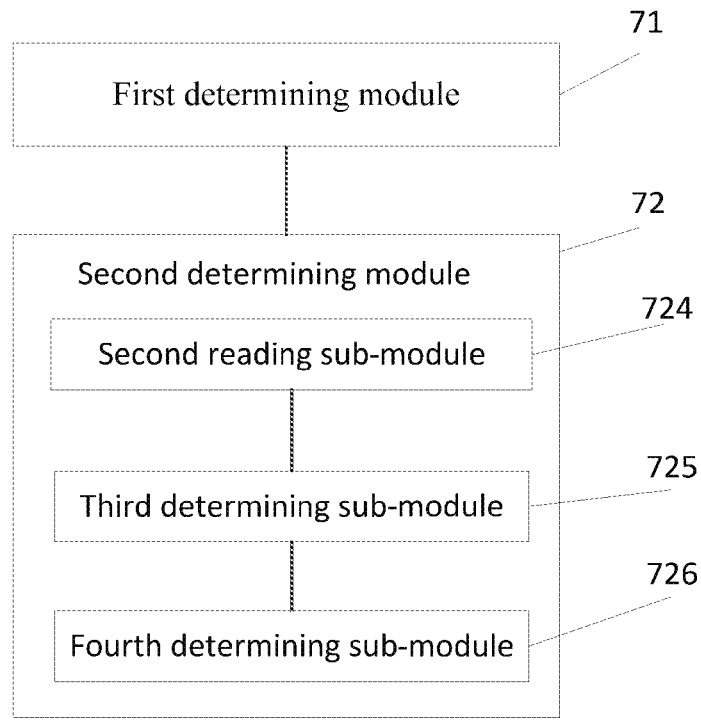
FIG. 9 is a structural diagram of a processor detection device provided by another exemplary embodiment of the present disclosure.

In an optional example, based on the embodiment shown in FIG. 7, as shown in FIG. 9, the second determining module 72 includes: a second reading sub-module 724 configured to read a parameter stored in a second preset register, wherein the second preset register is a register of the first-type register, and the parameter stored in the second preset register is used to characterize a target number of instructions which is quantity of instructions used to process the data currently processed by the detected processor; a third determining sub-module 725 configured to determine a changing state of the number of instructions characterized by the parameter read by the second reading sub-module 724 within the second preset time period; a fourth determining sub-module 726 configured to determine the working state of the detected processor based on the changing state of the number of instructions determined by the third determining sub-module 725 within the second preset time period.

In an optional example, the fourth determining sub-module 726 is specifically configured to determine the working state of the detected processor as the first type of working state if the number of instructions does not change within the second preset time period; otherwise, determining the working state of the detected processor as the second type of working state.

Figure 10:
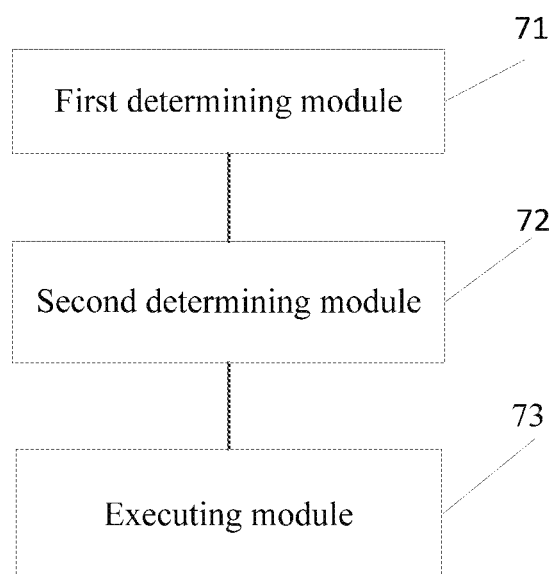
FIG. 10 is a structural diagram of a processor detection device provided by another exemplary embodiment of the present disclosure.

In an optional example, based on the embodiment shown in FIG. 7, as shown in FIG. 10, the device further includes: an executing module 73 configured to perform an interrupt missing handling operation if the working state of the detected processor determined by the second determining module 72 is the first type of working state.

In an optional example, the executing module 73 is specifically configured to output an interrupt missing alarm signal; and/or, generate a signal for simulating the interrupt trigger signal sent by the detected processor, and send the generated signal to a component designated to receive the interrupt trigger signal.

Exemplary Electronic Apparatus

Hereinafter, an electronic apparatus according to an embodiment of the present disclosure will be described with reference to FIG. 11. The electronic apparatus can be either or both of a first apparatus and a second apparatus, or a stand-alone apparatus independent of them, and the stand-alone apparatus can communicate with the first apparatus and the second apparatus to receive input signal data collected by them.

Figure 11:
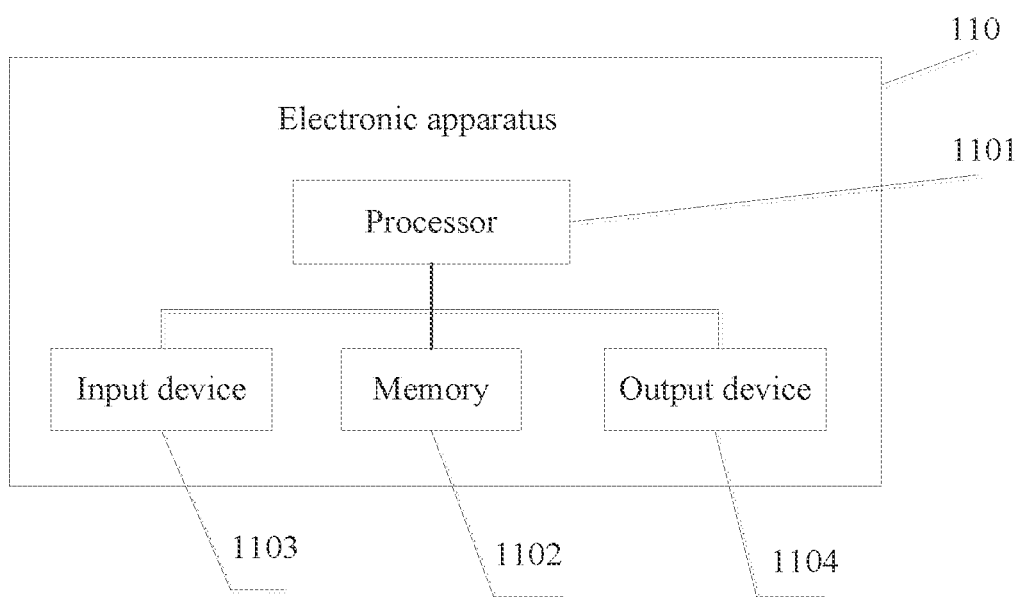
FIG. 11 is a structural diagram of an electronic apparatus provided by an exemplary embodiment of the present disclosure.

FIG. 11 illustrates a block diagram of an electronic apparatus according to an embodiment of the present disclosure.

As shown in FIG. 11, the electronic apparatus 110 includes one or more processors 1101 and a memory 1102.

The processor 1101 may be a central processing unit (CPU) or other form of processing unit with data processing capability and/or instruction executing capability, and may control other component in the electronic apparatus 110 to perform a desired function.

The memory 1102 may include one or more computer program products, and the computer program products may include various forms of computer-readable storage media, such as a volatile memory and/or a non-volatile memory. The volatile memory may include a random access memory (RAM) and/or a cache memory (cache), for example. The non-volatile memory may include, for example, read-only memory (ROM), hard disk, flash memory, and the like. One or more computer program instructions may be stored on the computer readable storage medium, and the processor 1101 may run the program instructions to implement the processor detection method of the various embodiments of the present disclosure described above and/or other desired functions. Various contents such as an input signal, a signal component, a noise component, etc. can also be stored in the computer-readable storage medium.

In an example, the electronic apparatus 110 may further include: an input device 1103 and an output device 1104, both of which are interconnected by a bus system and/or other forms of connection mechanisms (not shown).

For example, when the electronic apparatus is the first apparatus or the second apparatus, the input device 1103 may be a microphone or a microphone array. When the electronic device is a stand-alone device, the input device 1103 may be a communication network connector for receiving collected input signals from the first apparatus and the second apparatus.

In addition, the input device 1103 may also include, for example, a keyboard, a mouse, and so on.

The output device 1104 can output various kinds of information to outside. The output device 1104 may include, for example, a display, a speaker, a printer, a communication network and a remote output device connected thereto, and so on.

Of course, for simplicity, only some of components related to the present disclosure in the electronic apparatus 110 are shown in FIG. 11, and components such as buses, input/output interfaces, etc. are omitted. In addition, the electronic apparatus 110 may also include any other appropriate components according to specific application conditions.

Exemplary Computer Program Product and Computer-Readable Storage Medium

In addition to the above methods and apparatuses, the embodiments of the present disclosure may also be a computer program product, which includes computer program instructions that, when run by a processor, cause the processor to execute the steps in the detection method for the processor according to various embodiments of the present disclosure are described in the section "exemplary method" described above in this specification.

The computer program product may be program codes for performing the operations of the embodiments according to the present disclosure which is wrote by any combination of one or more programming languages including object-oriented programming languages, such as Java, C++, etc. The programming languages further include conventional procedural programming languages, such as "C" language or similar programming languages. The program code can be executed entirely on the user's computing device, partly executed on the user's device, executed as an independent software package, partly executed on the user's computing device and partly executed on the remote computing device, or entirely executed on the remote computing device or server.

In addition, the embodiment of the present disclosure may also be a computer-readable storage medium, on which computer program instructions are stored. When the computer program instructions are executed by a processor, the processor executes the steps in the detection method of the processor according to various embodiments of the present disclosure are described in "exemplary method" part of this specification.

The computer-readable storage medium may adopt one readable medium or any combination of more readable media. The readable medium may be a readable signal medium or a readable storage medium. The readable storage medium may include, but is not limited to, a system, an apparatus, or a device of an electrical, magnetic, optical, electromagnetic, infrared, or semiconductor, or a combination of any of the above, for example. More specific examples (non-exhaustive list) of readable storage media include: electrical connections with one or more wires, portable disks, hard disks, random access memory (RAM), read-only memory (ROM), erasable type programmable read only memory (EPROM or flash memory), optical fiber, portable compact disk read only memory (CD-ROM), optical storage device, magnetic storage device, or any suitable combination of the above.

The basic principles of the present disclosure are described in conjunction with specific embodiments above. However, it should be pointed out that the advantages, merits, effects, etc. mentioned in the present disclosure are only examples and not limitations, and these advantages, merits, effects, etc. cannot be considered as necessary for each embodiment of the present disclosure. In addition, the specific details of the foregoing disclosure are only for explanation and ease of understanding, rather than limitations, and the foregoing details do not limit the present disclosure to the foregoing specific details for implementation.

The various embodiments in this specification are described in a progressive manner, and each embodiment focuses on the differences from other embodiments, and the same or similar parts between the various embodiments can be referred to each other. As for the system embodiment, since it basically corresponds to the method embodiment, the description for it is relatively simplified, and the relevant part can refer to the part of the description of the method embodiment.

The block diagrams of the apparatus, devices, equipment, and systems involved in the present disclosure are merely illustrative examples and are not intended to require or imply that they must be connected, arranged, and configured in the manner shown in the block diagrams. As those skilled in the art will recognize, these apparatus, devices, equipment, and systems can be connected, arranged, and configured in any manner. Words such as "include," "including," "comprise," "comprising," "have" or the like are open vocabulary and mean "comprising but not limited to" and can be used interchangeably therewith. The terms "or" and "and" as used herein refer to the terms "and/or" and can be used interchangeably therewith, unless the context clearly indicates otherwise. The word "such as" used herein refers to the phrase "such as but not limited to" and can be used interchangeably therewith.

The method and apparatus of the present disclosure may be implemented in many ways. For example, the method and device of the present disclosure can be implemented by software, hardware, firmware or any combination thereof. The above mentioned order of the steps for the method is for illustration only, and the steps of the method of the present disclosure are not limited to the order specifically described above, unless specifically stated otherwise. In addition, in some embodiments, the present disclosure can also be implemented as programs recorded in a recording medium, and these programs comprise machine-readable instructions for implementing the method according to the present disclosure. Thus, the present disclosure also covers a recording medium storing a program for executing the method according to the present disclosure.

It should also be pointed out that in the device, apparatus and method of the present disclosure, each component or each step can be decomposed and/or recombined. These decomposition and/or recombination should be regarded as equivalent solutions of the present disclosure.

The above description of the disclosed aspects is provided to enable any person skilled in the art to fulfill or take use of the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown here, but shall be explained in accordance with the widest scope consistent with the principles and novel features disclosed herein.

The above description has been given for the purposes of illustration and description. In addition, this description is not intended to limit the embodiments of the present disclosure to the form disclosed herein. Although a number of example aspects and embodiments have been discussed above, those skilled in the art will conceive of certain variations, modifications, changes, additions, and subcombinations thereof.

What is claimed is:

1. A method for detecting a processor, comprising:
   determining a parameter stored in a first-type register in a detected processor, wherein the parameter stored in the first-type register relates to data to be processed currently by the detected processor;
   determining a working state of the detected processor based on the parameter stored in the first-type register; and
   performing an interrupt missing handling operation if the working state of the detected processor is a first type of working state,
   wherein the parameter stored in the first-type register is used to detect changes in the data processed by the detected processor, and the first type of working state is an interrupt missing state,
   wherein that the parameter stored in the first-type register relates to the data that needs to be processed currently by the detected processor, comprises that the parameter stored in the first-type register relates to a number of the data that needs to be processed currently by the detected processor, and the parameter stored in the first-type register relates to a processing mode of the data that needs to be processed currently by the detected processor which can be characterized by using information of instructions or functions called during processing.

2. The method of claim 1, wherein determining the working state of the detected processor based on the parameter stored in the first-type register comprises:
reading the parameter as stored in a first preset register, wherein the first preset register is a register of the first-type register, and the parameter stored in the first preset register is used to identify the data currently processed by the detected processor;
determining a changing state of the currently processed data within a first preset time period; and
determining the working state of the detected processor based on the changing state of the currently processed data within the first preset time period.

3. The method of claim 2, wherein determining the working state of the detected processor based on the changing state of the currently processed data within the first preset time period comprises:
determining the working state of the detected processor as a first type of working state if the currently processed data changes within the first preset time period; otherwise, determining the working state of the detected processor as a second type of working state.

4. The method of claim 1, wherein determining the working state of the detected processor based on the parameter stored in the first-type register comprises:
reading the parameter as stored in a second preset register, wherein the second preset register is a register of the first-type register, and the parameter stored in the second preset register is used to characterize a target number of the instructions which is a number of the instructions used to process the data currently processed by the detected processor;
determining a changing state of the number of instructions within a second preset time period; and
determine the working state of the detected processor based on the changing state of the number of instructions within the second preset time period.

5. The method of claim 4, wherein determining the working state of the detected processor based on the changing state of the number of instructions within the second preset time period comprises:
determining the working state of the detected processor as a first type of working state if the number of instructions does not change within the second preset time period; otherwise, determining the working state of the detected processor as a second type of working state.

6. The method of claim 1, wherein performing the interrupt missing handling operation comprises one or more of:
outputting an interrupt missing alarm signal; or
generating a signal for simulating an interrupt trigger signal sent by the detected processor, and sending the generated signal to an element designated to receive the interrupt trigger signal.

7. The processor detection method according to claim 2, wherein if an interrupt trigger signal is detected to be sent to the detected processor within a first present time period, the parameter as stored in a first present register is completely cleared, otherwise, the parameter as stored in the first preset register is kept unchanged.

8. The processor detection method according to claim 4, wherein if an interrupt trigger signal is detected to be sent to the detected processor within a second present time period, the parameter as stored in a second present register is completely cleared, otherwise, the parameter as stored in the second preset register is kept unchanged.

9. A non-transitory computer-readable storage medium comprising instructions that when executed by a processor of a device, cause the device to:
determine a parameter stored in a first-type register in a detected processor, wherein the parameter stored in the first-type register relates to data to be processed currently by the detected processor;
determine a working state of the detected processor based on the parameter stored in the first-type register; and
performing an interrupt missing handling operation if the working state of the detected processor is a first type of working state,
wherein the parameter stored in the first-type register is used to detect changes in the data processed by the detected processor, and the first type of working state is an interrupt missing state,
wherein that the parameter stored in the first-type register relates to the data that needs to be processed currently by the detected processor, comprises that the parameter stored in the first-type register relates to a number of the data that needs to be processed currently by the detected processor, and the parameter stored in the first-type register relates to a processing mode of the data that needs to be processed currently by the detected processor which can be characterized by using information of instructions or functions called during processing.

10. The non-transitory computer-readable storage medium of claim 9, further comprising instructions when executed by the processor of the device, cause the device to:
read the parameter as stored in a first preset register, wherein the first preset register is a register of the first-type register, and the parameter stored in the first preset register is used to identify the data currently processed by the detected processor;
determine a changing state of the currently processed data within a first preset time period; and
determine the working state of the detected processor based on the changing state of the currently processed data within the first preset time period.

11. The non-transitory computer-readable storage medium of claim 10, further comprising instructions when executed by the processor of the device, cause the device to:
determine the working state of the detected processor as a first type of working state if the currently processed data changes within the first preset time period; otherwise, determining the working state of the detected processor as a second type of working state.

12. The non-transitory computer-readable storage medium of claim 9, further comprising instructions when executed by the processor of the device, cause the device to:
read the parameter as stored in a second preset register, wherein the second preset register is a register of the first-type register, and the parameter stored in the second preset register is used to characterize a target number of instructions which is a number of instructions used to process the data currently processed by the detected processor;
determine a changing state of the number of instructions within a second preset time period; and
determine the working state of the detected processor based on the changing state of the number of instructions within the second preset time period.

13. The non-transitory computer-readable storage medium of claim 12, further comprising instructions when executed by the processor of the device, cause the device to:
   determine the working state of the detected processor as a first type of working state if the number of instructions does not change within the second preset time period; otherwise, determining the working state of the detected processor as a second type of working state.

14. The non-transitory computer-readable storage medium of claim 9, further comprising instructions when executed by the processor of the device, cause the device to one or more of:
   output an interrupt missing alarm signal; or
   generate a signal for simulating an interrupt trigger signal sent by the detected processor, and sending the generated signal to an element designated to receive the interrupt trigger signal.

15. An electronic device comprising:
   a processor;
   a memory for storing processor executable instructions;
   wherein the processor is configured to read the processor executable instructions from the memory, and execute the instructions to implement a processor detection method comprising:
   determining a parameter stored in a first-type register in a detected processor, wherein the parameter stored in the first-type register relates to data to be processed currently by the detected processor;
   determining a working state of the detected processor based on the parameter stored in the first-type register; and
   performing an interrupt missing handling operation if the working state of the detected processor is a first type of working state,
   wherein the parameter stored in the first-type register is used to detect changes in the data processed by the detected processor, and the first type of working state is an interrupt missing state,
   wherein that the parameter stored in the first-type register relates to the data that needs to be processed currently by the detected processor, comprises that the parameter stored in the first-type register relates to a number of the data that needs to be processed currently by the detected processor, and the parameter stored in the first-type register relates to a processing mode of the data that needs to be processed currently by the detected processor which can be characterized by using information of instructions or functions called during processing.

16. The electronic device of claim 15, wherein determining the working state of the detected processor based on the parameter stored in the first-type register, comprises:
   reading the parameter as stored in a first preset register, wherein the first preset register is a register of the first-type register, and the parameter stored in the first preset register is used to identify the data currently processed by the detected processor;
   determining a changing state of the currently processed data within a first preset time period; and
   determining the working state of the detected processor based on the changing state of the currently processed data within the first preset time period.

17. The electronic device of claim 16, wherein determining the working state of the detected processor based on the changing state of the currently processed data within the first preset time period comprises:
   determining the working state of the detected processor as a first type of working state if the currently processed data changes within the first preset time period; otherwise, determining the working state of the detected processor as a second type of working state.

18. The electronic device of claim 15, wherein determining the working state of the detected processor based on the parameter stored in the first-type register comprises:
   reading the parameter as stored in a second preset register, wherein the second preset register is a register of the first-type register, and the parameter stored in the second preset register is used to characterize a target number of instructions which is a number of instructions used to process the data currently processed by the detected processor;
   determining a changing state of the number of instructions within a second preset time period; and
   determine the working state of the detected processor based on the changing state of the number of instructions within the second preset time period.

19. The electronic device of claim 18, wherein determining the working state of the detected processor based on the changing state of the number of instructions within the second preset time period comprises:
   determining the working state of the detected processor as a first type of working state if the number of instructions does not change within the second preset time period; otherwise, determining the working state of the detected processor as a second type of working state.

* * * * *